United States Patent [19]
Tsubouchi et al.

[11] Patent Number: 5,647,462
[45] Date of Patent: Jul. 15, 1997

[54] VACUUM SERVO UNIT FOR A VEHICLE BRAKING SYSTEM

[75] Inventors: Kaoru Tsubouchi, Toyota; Akihiko Miwa, Anjo, both of Japan

[73] Assignee: Aisin Seiki Kabushiki Kaisha, Kariya, Japan

[21] Appl. No.: 611,685

[22] Filed: Mar. 6, 1996

[30] Foreign Application Priority Data

Mar. 7, 1995 [JP] Japan .................................... 7-047220

[51] Int. Cl.$^6$ ............................................... F15B 9/10
[52] U.S. Cl. ...................... 188/356; 91/376 R; 303/114.3
[58] Field of Search ................................ 303/114.3, 125, 303/113.6, 113.1, 113.3; 91/376 R, 369.1, 369.2, 369.4; 92/165 PR, 129; 188/356, 357

[56] References Cited

U.S. PATENT DOCUMENTS

| | | |
|---|---|---|
| 5,046,399 | 9/1991 | Koshimizu ........................... 91/376 R |
| 5,161,453 | 11/1992 | Yarad et al. ........................... 91/376 R |
| 5,483,866 | 1/1996 | Schlüter ................................ 303/113.4 |
| 5,493,946 | 2/1996 | Schlüter ................................ 303/113.4 |

FOREIGN PATENT DOCUMENTS

| | | |
|---|---|---|
| 4405092 | 12/1994 | Germany. |
| 2014274 | 8/1979 | United Kingdom ............... 92/165 PR |
| 9416927 | 8/1994 | WIPO .................................. 303/114.3 |

Primary Examiner—Douglas C. Butler
Attorney, Agent, or Firm—Burns, Doane, Swecker & Mathis, LLP

[57] ABSTRACT

A vacuum servo unit which is designed so that when a valve member associated with the plunger that is connected to an input member is out of engagement with the plunger, the power piston moves due to the pressure differential between a variable-pressure chamber and a constant pressure chamber for boosting the force to the input member, is provided with an arrangement for inhibiting or preventing inclination of the input member. The arrangement includes a plurality of projections extending outwardly from the input member, and a plurality of slots formed in the plunger for receiving the projections.

11 Claims, 2 Drawing Sheets

VACUUM SERVO UNIT FOR A VEHICLE BRAKING SYSTEM

FIELD OF THE INVENTION

The present invention relates to a vacuum booster, and in particular to a vacuum servo unit for a vehicle braking system which is designed to be automatically operated in addition to being operated through brake pedal depression.

BACKGROUND OF THE INVENTION

In recent years, an improved vacuum servo unit for a vehicle braking system has been developed in which an electrically activated solenoid is used for establishing an automatic braking operation, irrespective of a driver's brake pedal depression, when an emergency situation occurs such as the detection of a near obstacle in front of the moving vehicle. Such a vacuum servo unit can be applied to maintain a predetermined distance between adjacent vehicles and to maintain a vehicle on an upward slope.

A vacuum servo unit for a vehicle braking system similar to that described above is disclosed in German Patent Specification No. DE 4405092C1 which was published on Feb. 17, 1994. In the power piston assembly of this vacuum servo unit, an input member to be operated through operation of the brake operation member via an input rod is surrounded by a plunger which is displaced in the axial direction by energization of a solenoid. Sometimes the input rod may be inclined or slightly swung when the brake operation member is operated, and such an inclination urges the plunger in its radial direction. Since the resulting inclination of the plunger causes the plunger to be brought into engagement with one or more other neighboring elements which prevents the smooth movement of the plunger, a pipe shaped member is disposed between the power piston and the plunger. The reason for this is that in the absence of the pipe shaped member the friction between the plunger and each neighboring element prevents the plunger from being moved in the axial direction.

However, the provision of the pipe shaped member means that the number of parts comprising the unit increases as does the complexity of the unit. Also, the ease with which the power piston can be assembled is reduced.

SUMMARY OF THE INVENTION

In light of the foregoing, a need exists for a vacuum servo unit for a vehicle braking system which is not susceptible to the same disadvantages and drawbacks mentioned above.

A vacuum servo unit for a vehicle braking system in accordance with the present invention includes a housing, a movable wall disposed in the housing to divide the housing into a constant pressure chamber in fluid communication with a vacuum source and a variable-pressure chamber, and a power piston connected to the movable wall for outputting a braking force through movement in its axial direction due to a pressure difference between the constant pressure chamber and the variable pressure chamber. An input member is accommodated in the power piston and connected to a braking operation member so as to be movable in the axial direction upon receipt of a force therefrom. A plunger is connected to the input member to be movable in the axial direction and a valve member is associated with the plunger for controlling the braking force such that while the valve member is in engagement with the plunger the variable pressure chamber is in fluid communication with the constant pressure chamber and while the valve member is out of engagement with the plunger the variable pressure chamber is in fluid communication with the atmosphere. A solenoid moves the plunger upon receipt of electric current such that the plunger moves away from the valve member. An arrangement is also provided for inhibiting or preventing inclination of the input member. In a preferred form of the invention, this inclination inhibiting arrangement includes a plurality of circumferentially spaced projections extending outwardly from the plunger, and a plurality of the respective slots formed in the input member for receiving the projections.

BRIEF DESCRIPTION OF THE DRAWING FIGURES

The above and other features and advantages of the present invention will be more apparent and more readily appreciated from the following detailed description of a preferred embodiment of the present invention, considered in connection with the accompanying drawing figures, in which like elements are designated by like reference numerals and wherein;

FIG. 1 is a cross-sectional view of an embodiment of a vacuum servo unit for a vehicle braking system in accordance with the present invention; and FIG. 2 is a cross-sectional view of a portion of the vacuum servo unit taken along the section line 2—2 in FIG. 1.

DETAILED DESCRIPTION OF THE INVENTION

Figure 1:
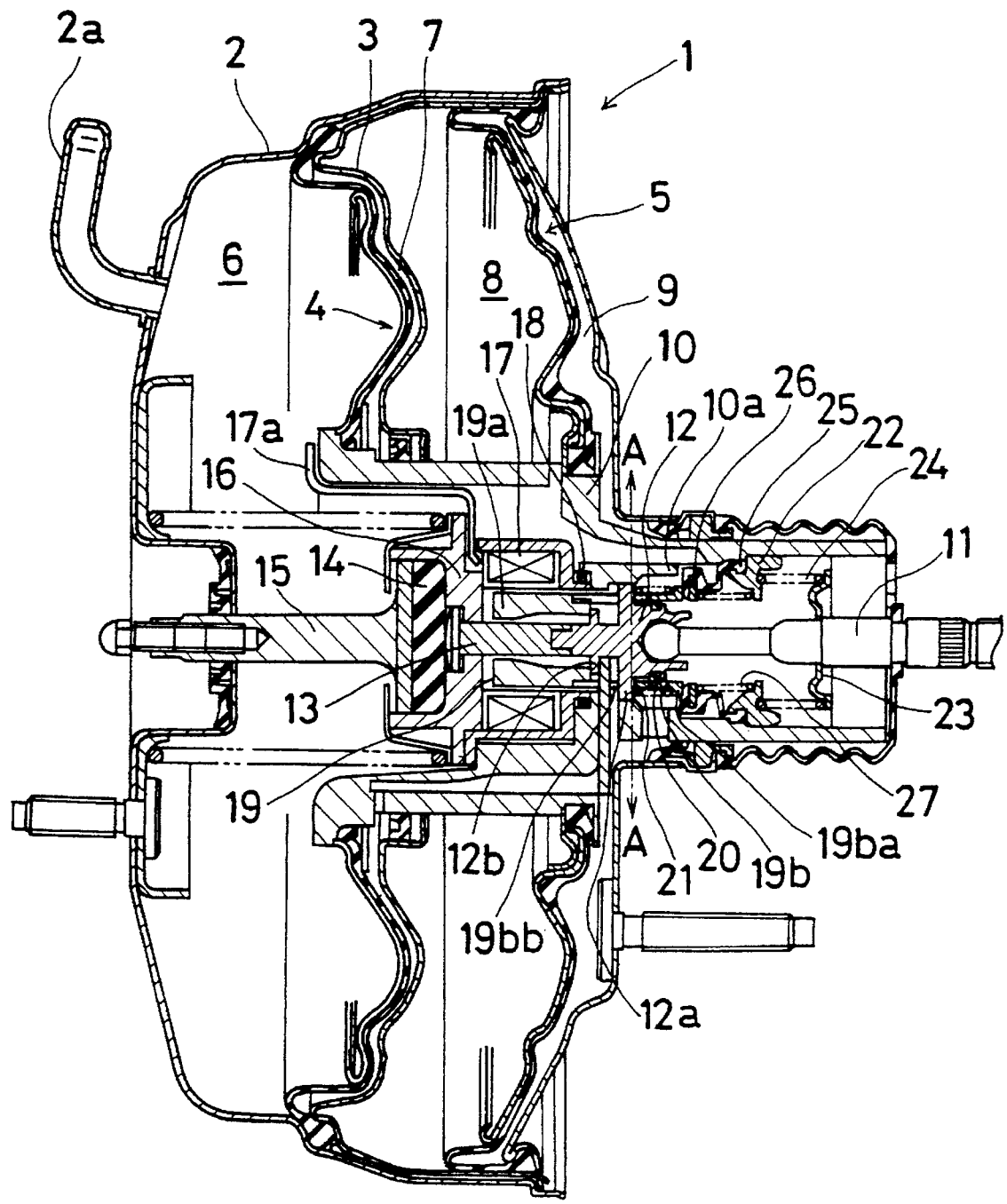
Figure 2:
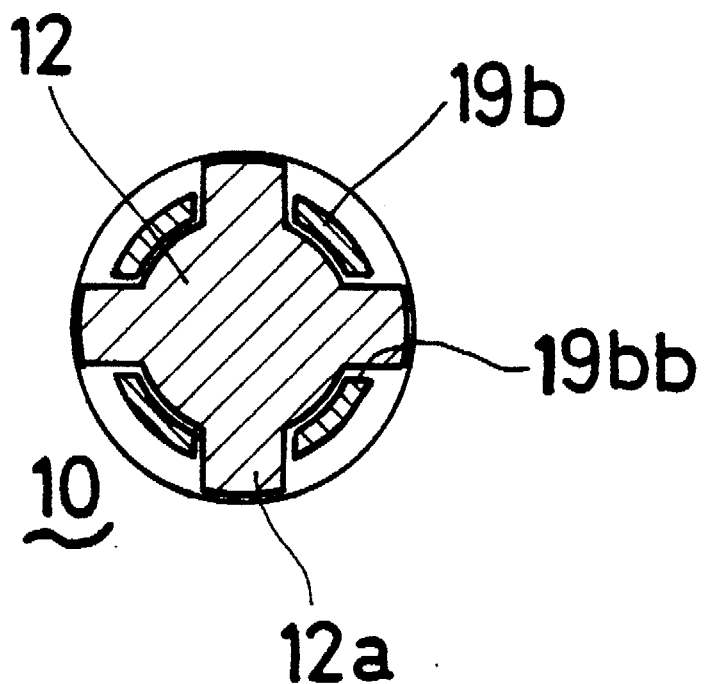

Referring to FIG. 1, an automatically activatable vacuum booster or vacuum servo unit 1 has a housing or shell 2 in which is mounted a power piston 10. The power piston 10 is mounted for movement in the axial direction of the housing 2. Disposed in the housing 2 are a stationary wall 3, a front movable wall 4, and a rear movable wall 5.

The outer periphery of the stationary wall 3 is fluid-tightly secured to the housing 2 while the inner periphery of the stationary wall 3 is mounted on the outer surface of the power piston 10 so that the power piston 10 is movable relative to the inner periphery of the stationary wall 3 in a fluid-tight manner. The front movable wall 4 is disposed in the housing 2 between the front or left side of the housing 2 and the stationary wall 3. The outer periphery of the front movable wall 4 is secured in a fluid-tight manner to the housing 2 while the inner periphery of the front movable wall 4 is secured in a fluid-tight manner to the outer surface of the power piston 10. The rear movable wall 5 is disposed between the rear or fight side of the housing 2 and the stationary wall 3. The outer periphery of the rear movable wall 5 is secured in a fluid-tight manner to the housing 2 and the inner periphery of the rear movable wall 5 is secured in a fluid-tight manner to the outer surface of the power piston 10.

The stationary wall 3, the front movable wall 4, and the rear movable wall 5 define a plurality of chambers within the interior of the housing 2. In particular, a front constant pressure chamber 6 is defined between the front side of the housing 2 and the front movable wall 4, a front variable pressure chamber 7 is defined between the front movable wall 4 and the stationary wall 3, a rear constant pressure chamber 8 is defined between the stationary wall 3 and the rear movable wall 5, and a rear variable pressure chamber 9 is defined between the rear movable wall 5 and the rear side of the housing 2.

The front constant pressure chamber 6 is connected to an engine intake manifold (not specifically shown) as a negative pressure source via an inlet or a conduit 2a. The front constant pressure chamber 6 is in fluid communication with the rear constant pressure chamber 8 in the housing 2. Thus, the front constant pressure chamber 6 and the rear constant pressure chamber 8 are kept at a constant negative pressure.

An input rod 11 is operatively connected to a brake pedal (not specifically shown) which functions as a brake operating member. The input rod 11 extends into a rear portion of the power piston 10 and is connected to a first input member 12 which is axially movable in the power piston 10. A second input member 13 is in engagement with the first input member 12 so as to be movable therewith upon initiation of a braking operation. The second input member 13 is engageable, during its axial movement, with a reaction disc 14 which serves for controlling the assisting force of the booster 1. In addition, the reaction disc 14 is connected to an output rod 15 from which the assisting force or the boosted braking force is derived.

A plate 16 for holding a solenoid 17 is secured to the power piston 10 in a fluid-tight manner via a sealing member 18. The solenoid 17 is coupled to a power supply (not specifically shown) outside the housing 2 via wires 17a (only one of which is shown). When electric current is supplied to the solenoid 17, the solenoid 17 is activated and an electro-magnetic force is generated.

A plunger 19 is disposed in the housing and is divided into a first part 19a and a second part 19b for easy assembly, with the second part 19b being threadably engaged with the first part 19a. The first input member 12 is slidably and fluid-tightly fitted in the inner periphery of the second part 19b of the plunger 19 via a sealing member or ring 20. The right end of the second part 19b of the plunger 19 is formed with a hook or bent portion 19ba. Four circumferentially arranged and equi-spaced radial projections 12a are formed on the first input member 12. A compression spring 21 is disposed between the hook portion 19ba of the second part 19b of the plunger 19 and the radial projections 12a of the first input member 12. The first input member 12 is also formed with a flange portion 12b. Thus, while the input rod 11 remains immovable, the plunger 19 is urged in the rightward direction (with respect to the orientation shown in FIG. 1) and is at rest by engagement of the first part 19a with the flange 12b of the first input shaft 12.

The second part 19b of the plunger 19 is formed with four circumferentially arranged and equi-spaced radial slots 19bb into which the four circumferentially disposed and equi-spaced radial projections 12a extend such that relative axial movement between the plunger 19 and the first input member 12 is permitted.

A first retainer 22 is mounted to the power piston 10 by receiving the expansion force of a spring 24 which is disposed between the first retainer 22 and a second retainer 23 fixed on the input rod 11. A valve member 25 is secured at its right end to the first retainer 22. The left end of the valve member 25 is fixed with a spring retainer 26. A valve spring 27 is disposed between the spring retainer 26 and the first retainer 22 so that the valve member 25 is in engagement with the second part 19 of the plunger 19b while the input rod 11 remains immovable. The valve member 25 is brought into engagement with a valve seat 10a provided on the power piston 10 when the input rod 11 is moved in the leftward direction.

In operation, when the braking member is not being operated the vacuum-operated power booster 1 maintains the condition illustrated in FIG. 1. Under such a condition, the valve member 25 is in engagement with the second part 19b of the plunger 19 and is also out of engagement with the valve seat 10a of the power piston 10. Also, the front variable chamber 7 and the rear variable chamber 9 are, via the front constant pressure chamber 6, in fluid communication with the vacuum source.

When the bake operation member or brake pedal is activated or depressed, the input rod 11 is moved in the leftward direction (with reference to the orientation shown in FIG. 1) together with the first input member 12. The resulting movement of the first input member 12 causes the plunger 19 to move leftward due to the engagement of the flange 12b with the plunger 19. Also, the valve member 25 moves in the leftward direction together with the plunger 19 due to the biasing force of the valve spring 27.

Further leftward movement of the plunger 19 causes the valve member 25 to come out of engagement with the plunger 19 and to be brought into engagement with the valve seat 10a of the power piston 10. Thus, the front variable pressure chamber 7 and the rear variable pressure chamber 8 are isolated from the vacuum source and are brought into fluid communication with the atmosphere. As a consequence, a pressure differential develops between the front constant pressure chamber 6 and the front variable pressure chamber 7. Similarly, a pressure differential develops between the rear constant pressure chamber 8 and the rear variable pressure chamber 9.

The front movable wall 4 and the rear movable wall 5 which receive the resultant pressure differentials apply an urging force to the power piston 10. Thus, a boosted force is outputted from the output rod 15 which is connected via the reaction disc 14 to the power piston 10. Thereafter, the assisted or outputted force of the booster 1 is regulated or controlled in accordance with the depressing force applied to the input rod 11 via the brake pedal such that the reaction force transmitted to the input rod 11 from the reaction disc 14 via the first input member 12 and the second input member 13 brings the selective engagement of the valve member 25 with the plunger 19 and the valve seat 10a.

Upon the occurrence of a situation requiring automatically operated braking operation, such a situation would be recognized by a micro-processor (not specifically shown). The power source, the wires 17a and the solenoid 17 constitute an electric circuit to supply electric current to the solenoid 17 for activating or energizing the solenoid 17. The solenoid 17 causes the plunger 19, independent of the movement of the first input member 12, to move in the leftward direction against the frictional force of the sealing member 20 and the biasing force of the spring 21. As a result of the leftward movement of the plunger 19, the valve member 25 under the biasing force of the valve spring 27 moves in the leftward direction together with the plunger 19. Then, the valve member 25 is separated from the valve member 19 and is brought into engagement with the valve seat 10a of the power piston 10. Consequently, a pressure differential between the front constant pressure chamber 6 and the front variable pressure chamber 7 is developed. Likewise, a pressure differential develops between the rear constant pressure chamber 8 and the rear variable pressure chamber 9. The front movable wall 4 and the rear movable wall 5 which receive the resultant pressure differentials, respectively, urge the power piston 10 in the leftward direction. Thus, a boosted force is outputted from the output rod 15 which is connected via the reaction disc 14 to the power piston 10.

When the micro-processor recognizes that further automatic braking operation is unnecessary, the current supply from the power supply to the solenoid 17 is stopped and the plunger 19 comes free from the solenoid 17 As a result, the plunger 19 is moved in the rightward direction (with respect to the arrangement shown in FIG. 1) by the biasing force of the spring 21. Due to the engagement of the valve member 25 with the plunger 19 under the resultant movement, the valve member 25 is also moved in the rightward direction and is moved away from the valve seat 10a of the power piston 10. This leads to the isolation of the front variable pressure chamber 7 and the rear variable pressure chamber 9 from the atmosphere. This also leads to fluid communication of the front variable pressure chamber 7 and the rear variable pressure chamber 9 with the front constant pressure chamber 6 and the rear constant pressure chamber 8, respectively, the latter two of which are connected to the vacuum pressure source. Thus, no pressure differential exists between the from constant pressure chamber 6 and the from variable-pressure chamber 7. Similarly, no pressure differential exists between the rear constant-pressure chamber 8 and the rear variable pressure chamber 9. As a result, no assisting force is applied to the power piston 10, by which the device is returned to its original condition as shown in FIG. 1.

If the plunger 19 is moved in the leftward direction by the activation of the solenoid 17 while the first input member 12 is being moved in the leftward direction by the brake pedal depression via the input rod 11, even though a swinging movement of the input rod 11 might tend to cause an inclination of the first input member 12 relative to the axis, the radial projection 12a of the first input member 12 is brought into engagement with the inner surface of the power piston 10, thereby preventing further inclination of the first input member 12. On the other hand, the second part 19b of the plunger 19 is provided with the slit 19bb through which the radial projection 12a of the first input member 12 passes and so the second part 19b does not receive a force caused by the foregoing inclination of the first input member 12. Thus, when the plunger 19 is moved by the activated solenoid 17, the plunger 19 is prevented from abutting the power piston 10 and/or one or more neighboring members, thereby enabling smooth movement of the plunger 19 which ensures a designed reliability of the device 1. This leads to less electromagnetic force associated with the solenoid 17 which will permit realization of a miniaturization of the solenoid. Thus, the device as a whole can be made smaller and more light weight.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vacuum servo unit for a vehicle braking system comprising:

a housing;

a movable wall disposed in the housing to divide the housing into a constant-pressure chamber in fluid communication with a vacuum source and a variable-pressure chamber;

a power piston connected to the movable wall for outputting a braking force through axial movement in response to a pressure differential between the constant pressure chamber and the variable pressure chamber;

an input member accommodated in the power piston for being connected to a braking operation member, the input member being axially movable in response to a force from the braking operation member;

an axially movable hollow plunger operatively connected to the input member and surrounding the input member;

a valve member associated with the plunger for controlling the braking force such that when the valve member is in engagement with the plunger the variable pressure chamber is in fluid communication with the constant pressure chamber and when the valve member is out of engagement with the plunger the variable pressure chamber in fluid communication with the atmosphere;

a solenoid connectable to a source of electric current for moving the plunger away from the valve member; and means for inhibiting radial force transmission from the input member to the plunger, said means including a plurality of circumferentially spaced projections projecting outwardly from the input member for transmitting the radial force from the input member to the power piston, and a plurality of slots formed in the plunger that receive the projections.

2. A vacuum servo unit as set forth in claim 1, wherein the plurality of projections are equally spaced apart from one another.

3. A vacuum servo unit as set forth in claim 1, wherein said plurality of projections is four projections.

4. A vacuum servo unit as set forth in claim 1, wherein the plunger includes a first part and a second part, at least a portion of the input member being fluid-tightly held within the second part of the plunger.

5. A vacuum servo unit as set forth in claim 1, wherein one end of the second part of the plunger includes a bent portion, and including a spring disposed between the projections and the bent portion.

6. A vacuum servo unit for a vehicle braking system comprising:

a housing having an interior in which is located a movable wall that divides the interior into a constant pressure chamber for connectable to a vacuum source and a variable pressure chamber;

an axially movable power piston connected to the movable wall for outputting a braking force upon the occurrence of a pressure differential between the constant pressure chamber and the variable pressure chamber;

an axially movable input member disposed in the power piston and connected to a braking operation member;

an axially movable hollow plunger operatively connected to the input member and surrounding the input member;

a valve member positioned within the power piston and movable between a first position in engagement with the plunger to fluidly communicate the variable pressure chamber with the constant pressure chamber and a second position spaced from the plunger to fluidly communicate the variable pressure chamber with the atmosphere;

means for causing the valve member to move from the first position to the second position to fluidly communicate the variable pressure chamber with the atmosphere and thereby cause a pressure differential between the variable pressure chamber and the constant pressure chamber which produces axial movement of the power piston; and means provided on at least the input member for inhibiting radial force transmission from the input member to the plunger during axial movement of the input member by transmitting the radial force from the input member to the power piston.

7. A vacuum servo unit as set forth in claim 6, wherein said means for inhibiting radial force transmission from the input member to the plunger during axial movement of the input member by transmitting the radial force from the input member to the power piston includes at least one projection extending outwardly from the input member, and a slot formed in the plunger that receives the projection.

8. A vacuum servo unit as set forth in claim 6, wherein said means for inhibiting radial force transmission from the input member to the plunger during axial movement of the input member by transmitting the radial force from the input member to the power piston includes a plurality of spaced apart projections extending outwardly from an outer circumference of the input member, and a plurality of slots formed in the plunger that each receive one of the projections.

9. A vacuum servo unit as set forth in claim 6, wherein the plunger includes a first part and a second part, a portion of the input member being fluid-tightly held within the second part of the plunger.

10. A vacuum servo unit as set forth in claim 9, wherein one end of the second part of the plunger includes a bent portion, and including a spring disposed between the projections and the bent portion.

11. A vacuum servo unit as set forth in claim 6, wherein said means for causing the valve member to move includes a solenoid.

* * * * *